(12) United States Patent
Bui

(10) Patent No.: US 6,763,478 B1
(45) Date of Patent: Jul. 13, 2004

(54) VARIABLE CLOCK CYCLE FOR PROCESSOR, BUS AND COMPONENTS FOR POWER MANAGEMENT IN AN INFORMATION HANDLING SYSTEM

(75) Inventor: Vinh X. Bui, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 583 days.

(21) Appl. No.: 09/695,607

(22) Filed: Oct. 24, 2000

(51) Int. Cl.[7] .............................. G06F 1/04; G06F 1/26
(52) U.S. Cl. ..................... 713/600; 713/320; 713/322
(58) Field of Search ................................. 713/300, 322, 713/340, 323, 501, 600; 711/154; 327/44

(56) References Cited

U.S. PATENT DOCUMENTS

| | | | | |
|---|---|---|---|---|
| 4,908,523 | A | * 3/1990 | Snowden et al. | ............ 307/43 |
| 5,115,503 | A | 5/1992 | Durkin | ........................ 395/550 |
| 5,319,772 | A | * 6/1994 | Hwang | ....................... 713/501 |
| 5,369,771 | A | 11/1994 | Gettel | ......................... 395/750 |
| 5,513,340 | A | 4/1996 | Kowert | ....................... 395/550 |
| 5,581,693 | A | 12/1996 | Pecone | .................. 395/183.01 |
| 5,600,839 | A | * 2/1997 | MacDonald | ................ 713/322 |
| 5,628,019 | A | * 5/1997 | O'Brien | ...................... 713/322 |
| 5,835,750 | A | 11/1998 | Pan-Ratzlaff | ............... 395/500 |
| 5,987,614 | A | * 11/1999 | Mitchell et al. | ............ 713/300 |
| 6,118,306 | A | * 9/2000 | Orton et al. | .................. 327/44 |
| 6,292,430 | B1 | * 9/2001 | Ohtake et al. | .............. 365/233 |
| 6,457,135 | B1 | * 9/2002 | Cooper | ....................... 713/323 |
| 6,477,609 | B1 | * 11/2002 | Reiss et al. | ................. 710/306 |
| 6,530,001 | B1 | * 3/2003 | Lee | ............................. 711/154 |
| 6,564,332 | B1 | * 5/2003 | Nguyen et al. | ............. 713/340 |

FOREIGN PATENT DOCUMENTS

JP   404302314 A  * 10/1992

OTHER PUBLICATIONS

Sirbalan Santhanam et al., "A Low–Cost, 300–MHz, RISC CPU with Attached Media Processor", IEEE Journal of Solid–State Circuit, vol. 33, No. 11, Nov. 1998, pp. 1829–1839.*

* cited by examiner

Primary Examiner—Thomas Lee
Assistant Examiner—Chun Cao
(74) Attorney, Agent, or Firm—Baker Botts, LLP

(57) ABSTRACT

A computer system that is able to switch processor and bus frequencies, along with processor voltage, when the system is placed into AC from battery power mode, and when the system is placed into battery from AC power mode. The computer system includes transitioning a processor (CPU) into a low performance mode using a clock generator that provides different clock frequencies, a high performance clock frequency and a low performance clock frequency depending on whether battery or AC power is used. The processor and interconnecting busses use the lower clock frequency in order to save battery power.

10 Claims, 2 Drawing Sheets

VARIABLE CLOCK CYCLE FOR PROCESSOR, BUS AND COMPONENTS FOR POWER MANAGEMENT IN AN INFORMATION HANDLING SYSTEM

BACKGROUND OF THE INVENTION

1. Field of the Invention

The present invention relates to computer systems, and more particularly to a portable computer system that changes system clock speed when entering into battery power mode or entering alternating current mode.

2. Description of the Related Art

In the field of electronic computing, portable computers have attained widespread use. Their small size and transportability make them an invaluable tool to today's on the go individual. Faster CPUs with denser circuits are continually introduced into portable computers providing greater computing ability. These new CPUs, however, require greater energy resources from portable computer batteries. Added or enhanced features such as sound, graphics, and data drives such as digital video disks (DVD), further require additional battery power. More sophisticated software applications may also indirectly require a greater battery drain. Portable computer owners can avoid the worry of energy drain by simply plugging their machines into an alternating current (AC) outlet, however, this defeats the mobility advantage of a portable computer. In many instances there is no outlet to make use of. An alternate solution is to have a backup battery, but an extra battery takes up space and requires that the user assure that it is always properly charged.

To some degree batteries have also improved. Today's batteries provide a greater charge life than their predecessors. Computing capability, namely CPU speeds, seems to always improve faster than battery technology. There is always the need to increase battery life, to extend the period of time required to recharge a battery, and to ultimately provide greater portable use to a portable computer user.

For certain applications such as word processing or spreadsheet programs, the system does not need to run at full performance, especially when the system is under battery power. For demanding applications, applications such as interactive gaming, full performance may be required regardless of whether the system is using AC or battery power.

To make use of the times when a system does not need to be at full performance and to extend the life of a battery, it has been found that a CPU can be operated at a lower clock speed when operating on direct current (battery). The system then is switched over to "performance" mode using a higher clock speed when the computer is operated on AC. Such an approach has been implemented by the Intel® Corporation in its Speedstep™ technology.

When working on battery, a portable PC with Speedstep™ technology automatically detects the change and drops both the CPU clock frequency and voltage. A CPU with Speedstep™ technology can be switched between two performance modes—maximum performance and battery-optimized performance—either automatically or by user command. By default, a portable PC with Speedstep™ technology detects when it is plugged into or unplugged from an AC outlet. When the portable PC is unplugged, the CPU core clock frequency drops to 500 MHz from the peak frequency of 600 MHz or 650 MHz. At the same time, the operating voltage of the CPU drops to 1.35 volts from 1.6 volts. When the portable PC is plugged back into an outlet, the CPU goes back up to peak frequency and increases voltage to 1.6 volts.

Users can also manually adjust the Speedstep™ technology mode operation by accessing an applet, the applet typically appearing as an icon on a Microsoft® Windows® taskbar. For example if the user wants increased performance, although the system is running on battery and low performance mode, the user can go to high performance by initiating the applet and forcing the CPU to go to high performance mode.

It has been found that Speedstep™ technology can reduce the active power of the CPU up to 45% while maintaining up to 80% of the maximum performance. Switching voltage levels provides significant power savings, because power consumption occurs in proportion to the square of voltage. In addition reduction in clock frequency also reduces power consumption. Clock frequency has a linear relationship with power consumption. The reduction in power consumption by reducing the clock frequency is not as dramatic as a reduction in voltage, but there is still considerable power savings.

Now referring to FIG. 1, which depicts the prior art Speedstep™ technology. A Speedstep™ transition request may be initiated by a device or application and routed through the Super I/O Controller. The computer's Operating System (OS) is made aware of such a request and the transition request is made. The OS recognizes that the PC's power source is being switched from battery to AC, or from AC to battery. The request may also be due to initiating the Speedstep™ applet.

As the Speedstep™ transition request is made, the OS conducts normal system or house keeping processes, then the OS transfers control to a Speedstep™ driver. The Super I/O Controller 10 passes Speedstep™ driver transition protocols by a bus to a South Bridge application specific integrated circuit (ASIC) controller 20. The Speedstep™ driver transition protocols are coordinated between the South Bridge ASIC 20 and an Intel ® (Geyserville ™ ASIC 40 through an interface 22.

The Speedstep™ driver then commands the South Bridge ASIC 20 to put the Speedstep™ CPU 70 into a deep sleep, also known as a C3, state. The C3 state is one of four power states, the other three being C0, C1, and C2, defined by the Advance Configuration and Power Interface (ACPI) Specification. The ACPI Specification has been adopted by various CPU manufacturers and other parties in the computing industry. The ACPI Specification power states, in particular, addresses the condition(s) that a CPU is in while in a specific state, in particular power consumption and thermal management conditions. While in the C3 state, the CPU's caches maintain state but ignore any snoops (inquiries). The operating software is responsible for ensuring that the caches maintain coherency. It has been found that while the Speedstep™ CPU 70 is in C3 state, frequency transition and voltage transition can be optimally changed. Duties of the Speedstep™ CPU 70 are greatly reduced while in the C3 state. For example while in the C3 state, other chipset hardware will maintain CPU cache coherency since the Speedstep™ CPU 70 while in C3 is unable to support this function.

During C3 state, the SDRAM Memory 90 enters a self refresh mode to maintain content. The SDRAM Memory 90 is connected by memory bus 95 to the North Bridge ASIC 30. A memory clock signal 80 is sent to the SDRAM Memory 90 from the Memory Clock Buffer 80. While in C3 state, the memory clock signal 80 is stopped, along with any other clocks that may go to the Speedstep™ CPU 70 and the North Bridge ASIC 30.

Once the Speedstep™ CPU 70 is in C3 state, the Geyserville™ ASIC 40 provides a voltage hi/lo instruction 55 to the CPU Power Supply 60. The CPU Core Voltage 110 supplied by CPU Power Supply 60 is then adjusted according to the performance mode of the Speedstep™ transition, a higher voltage for high performance and a lower voltage for low performance.

In addition, while the Speedstep™ CPU 70 is in C3 state, Geyserville™ ASIC 40 notifies the North Bridge ASIC 30 and the Speedstep™ CPU 70 that the performance mode will change. The Geyserville™ ASIC 40 interfaces with the North Bridge ASIC 30 through South Bridge ASIC 20. South Bridge ASIC 20 in turn communicates to North Bridge ASIC 30 by peripheral component interconnect (PCI) Bus 25. South Bridge ASIC 20 primarily controls PCI Devices, such as PCI Device 110 and PCI Device 120 along the PCI Bus 25. The PCI bus will always run at a clock frequency of 33 MHz. The 33 MHz clock frequency is inherent to the PCI bus.

Control information is passed by South Bridge ASIC 20 to the North Bridge ASIC 30, the North Bridge ASIC 30 in turn passes the information to the Speedstep™ CPU 70 by the Front Side Bus (FSB) 105. The FSB 105 typically and continually maintains a clock speed of 100 MHz. This FSB 105 bus frequency of 100 MHz is also the same frequency as that is on the memory bus frequency 95. The North Bridge ASIC 30 is the primary interface to the Speedstep™ CPU 70. Any memory clock signals 75 that may be sent to Memory Clock Buffer 80 are passed by the North Bridge ASIC 30.

In the case of a battery to AC transition, the Speedstep™ CPU 70 is transitioned to a higher clock frequency, 600 or 650 MHz, and is provided with a higher core voltage. When an AC to battery transition takes place, the Speedstep™ CPU 70 is transitioned to a lower clock frequency, 500 MHz, and is provided with a lower core voltage. The clock frequency is determined by a multiple found and set in the Speedstep™ CPU 70. The multiple, either approximately six (6) for high performance or five (5) for low performance is multiplied by the clock frequency of the FSB 105. Since the FSB 105 always operates at 100 MHz, high performance mode translates to six times 100 MHz or 600 MHz. Likewise, low performance is five times 100 MHz or 500 MHz.

Essentially, with current Intel®) Speedstep™ technology, only the Speedstep™ CPU 70 frequency is reduced. During the operation of many applications, the Speedstep™ CPU 70 is idling and not requiring high performance. To further save battery power, it would be desirable to reduce further the clock frequency of the Speedstep™ CPU 70 or similar processor. In addition it would be desirable to reduce the clock frequency of the busses interconnecting the various components of the system.

SUMMARY OF THE INVENTION

Accordingly, the object of the present invention is to reduce system clock speed on a portable computer system and allowing battery life to be extended when operating on battery power, and increasing clock speed to make use of optimum performance when operating on AC power.

Briefly described, the invention contemplates providing instructions to ASICs to provide transitional signals to a clock generator, CPU power supply, and operational busses to operate at a lower frequency. The invention makes use of the deep sleep transitional state when busses, the CPU, and other devices are functionally operating. Changes are made during the state transition to accommodate for the proper frequency; low frequency for battery power and high frequency for AC power.

DESCRIPTION OF THE PREFERRED EMBODIMENTS

Figure 1:
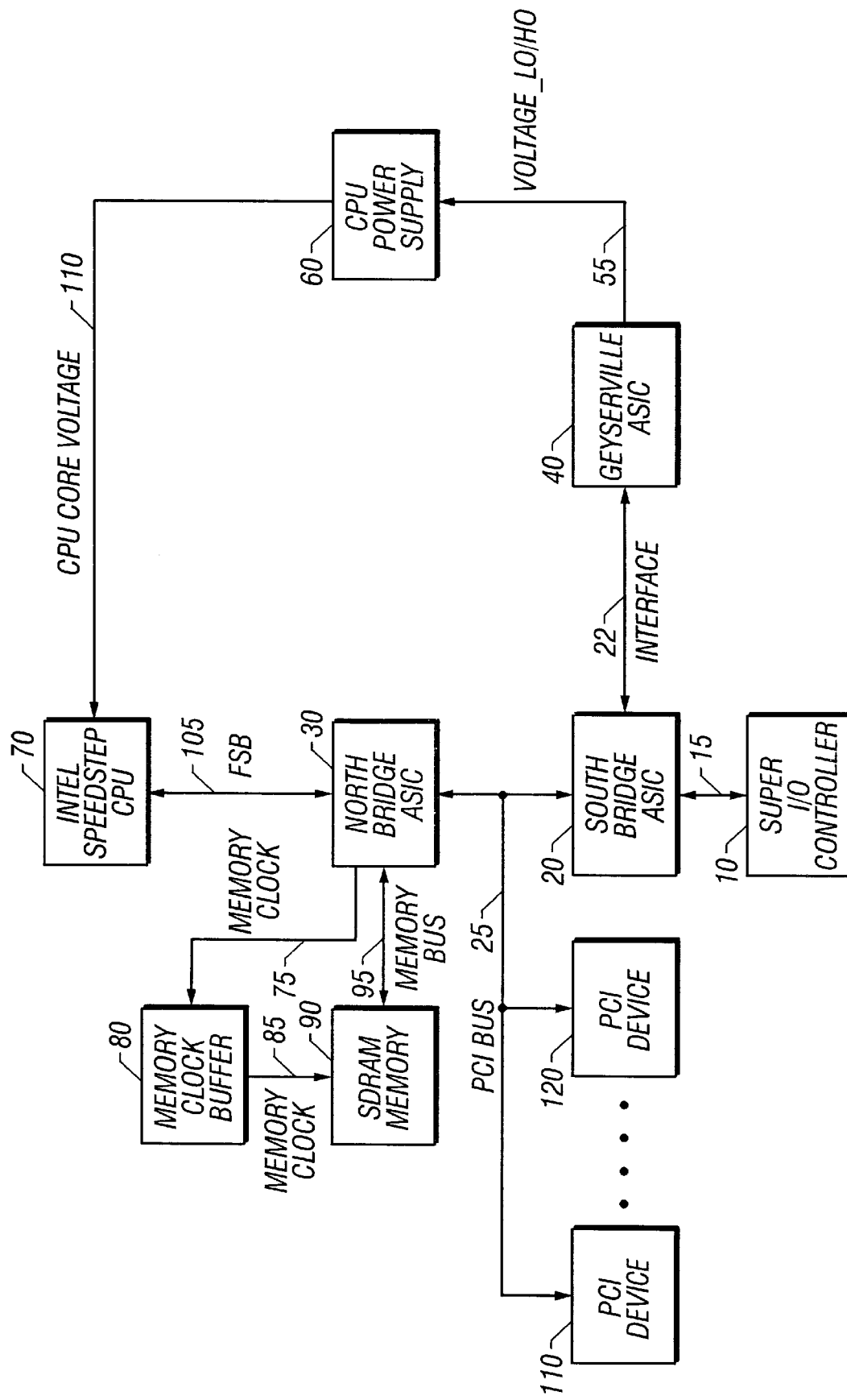
FIG. 1 is a static diagram illustrating computer system using current Intel® Speedstep™ Technology.

In the description which follows, like parts are marked throughout the specification and drawings with the same reference numerals, respectively. The drawing figures are not necessarily to scale, and certain features of the invention may be shown exaggerated in scale in the interest of clarity and conciseness.

Figure 2:
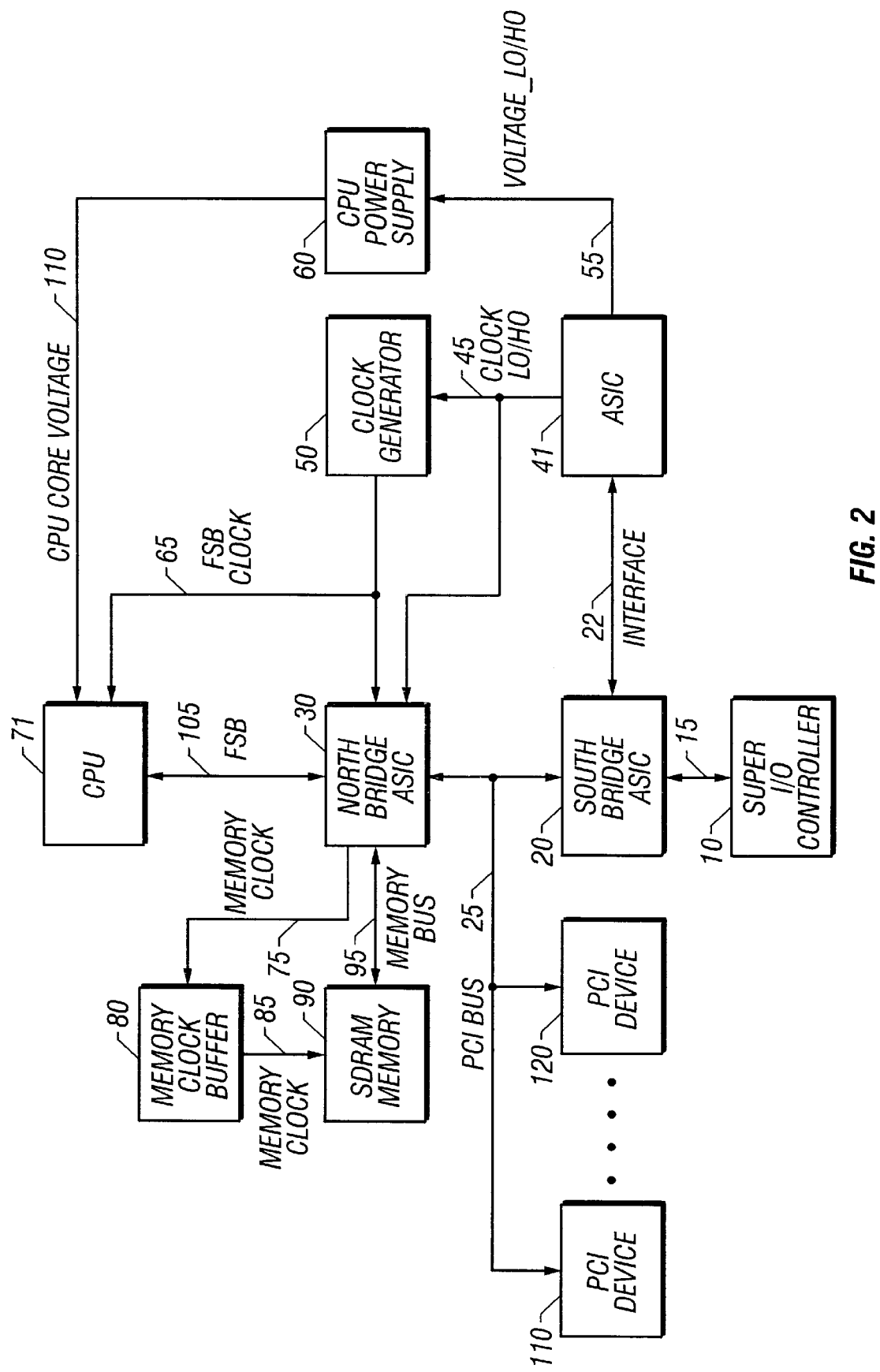
FIG. 2 is a schematic diagram illustrating a computer system with improved CPU low and high performance transitions.

Referring now to FIG. 2, a schematic illustrating the computer system with improved low and high performance transitions. A transition change may be initiated by the OS by detection of a change from battery to AC, or from AC to battery power, in essence plugging or unplugging an AC connector from the system. Alternatively the transition may be requested by the operator initiating an applet, such as a Speedstep™ applet. Once the transition is detected, the OS continues with normal house keeping routines and then transfers command to a software driver. The software driver in turn coordinates protocol instructions with a South Bridge ASIC 20, an ASIC 41, and the CPU 71. The CPU 71 communicates by FSB 105 to the North Bridge ASIC 30. In turn the South Bridge ASIC 20 communicates by PCI Bus 25 to the North Bridge ASIC 30. Instructions that may be provided to the CPU 71 from ASIC 41 are routed through the South Bridge ASIC 20. In this embodiment a clock lo/hi 45 signal is directly provided to the North Bridge ASIC 30.

The PCI Bus 25 inherently will always operate at 33 MHz and is primarily intended as a bus that communicates to PCI devices such as PCI Device 110 and PCI Device 120. The PCI bus architecture requires bridge controllers to communicate or provide instructions from the CPU 71 and further to communicate to other system devices, in this particular embodiment through a Super I/O controller 10.

The CPU 71 is placed into a deep sleep or C3 state, once the South Bridge ASIC is informed of a performance transition. When the CPU 71 is in C3 state all clock signals, in particular the FSB clock signal 65 and memory clock signal 75 are stopped. The SDRAM Memory 90 goes into a self refresh mode to maintain current content; as the memory clock 75 is stopped, the memory clock buffer 80 stores content.

While the CPU 71 is in C3 state, the ASIC 41 notifies the Clock Generator 50, the CPU Power Supply 60 and the North Bridge ASIC 30 that a performance mode transition will occur. The North Bridge ASIC 30 may be informed by this transition directly by ASIC 41 by a clock lo/hi signal 45. The same clock lo/hi signal 45 is provided to the clock generator 50, informing clock generator 50 that a performance mode transition will occur. In this embodiment, the clock lo/hi signal 45 also instructs the clock generator 50 either to provide a high performance 100 MHz or a low performance 66 MHz clock signal as represented by FSB Clock signal 65.

In this embodiment of the invention, the clock generator 50 provides a 66 MHz or a 100 MHz clock frequency that will be used by the FSB 105 and the memory bus 95. The clock generator 50 will output the clock signal as FSB Clock 65. The FSB Clock 65 is received by the CPU 71 and the North Bridge ASIC 30. The clock frequency sent to the North Bridge ASIC 30 and CPU 71 will determine the clock frequency of the FSB 105 and the memory bus 95. When operating in low performance, FSB 105 bus frequency and memory bus 95 frequency will be set to 66 MHz . In high performance mode the two busses will operate at 100 MHz.

A reduction in system processing and power consumption is seen with the reduction of clock frequency along the busses represented by FSB 105 and memory bus 95. In addition the CPU 71 clock frequency is further reduced when operating at low performance mode. Since the FSB is operating at 66 MHz while in low performance mode, the clock frequency of the CPU 71 is reduced to the lower clock frequency multiple of the CPU 71 times 66 MHz. For example, if a Speedstep™ technology based processor is used, the lower multiple is five and the processor clock frequency would be 5 times 66 MHz or 330 MHz. In high performance mode, the FSB 105 frequency is 100 MHz and the high performance multiple is six, therefore the clock frequency of the CPU 71 will be six times 100 MHz or 600 MHz. Considering the reduction of low performance clock frequency to 330 MHz from 500 MHz, there is a marked improvement. In addition the memory bus 95 clock frequency is reduced from 100 MHz to 66 MHz in low performance mode. This saves additional power. Because of the reduced operating clock frequencies of FSB 105, memory bus 95, and CPU 71, voltage may also be decreased further from the current Speedstep™ technology voltage of 1.35 volts during low performance mode.

The North Bridge ASIC 30 relays the clock frequency signal, either 66 MHz or 100 MHz, as a clock frequency signal represented by memory clock signal 75. The emory clock signal 75 is sent to the memory clock buffer 80, and the clock frequency is passed on as a memory clock signal 85 to SDRAM memory 90. Memory bus 95 will operate at the clock frequency that is generated by the clock generator 50 and passed through North Bridge ASIC 30.

With FSB 105, memory bus 95, and CPU 71 operating at reduced clock frequencies while in battery mode, considerable power savings is seen. When performance mode is desired the FSB 105 and memory bus 95, along with CPU 71 can efficiently be switched over to a higher clock frequency.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. For example, a clock generator can generate different clock frequencies. Different bus architectures can be employed that provide the same function as a PCI Bus architecture structure, which in turn would require a different input and output system as provided by a North Bridge ASIC and a South Bridge ASIC. The embodiment was chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents.

What is claimed is:

1. A computer system having controllable processor and bus clock frequencies, the computer system comprising:
   a processor which operates at a selectable clock frequency;
   a north bridge controller;
   a first bus connecting the north bridge controller to the processor, the first bus operating at a selectable clock frequency;
   a clock generator, the clock generator providing selectable clock frequencies to the processor and the first bus;
   a controller which instructs the clock generator as to clock frequency, whereby the controller receives commands from the computer system;
   a memory storage device; and
   a second bus connecting the memory storage device to the processor, wherein the clock frequency of the second bus is provided by the clock generator.

2. The computer system of claim 1 further comprising:
   a third bus;
   a south bridge controller interfacing with the north bridge controller by the third bus; and
   a set of peripheral devices interfacing with the south bridge controller by the third bus.

3. The computer system of claim 2 further comprising:
   a fourth bus; and
   a super input output controller interfacing with the south bridge controller by the third bus.

4. The computer system of claim 3 further comprising: an user mode instruction which is received by the super input output controller, whereby system operating mode is changed when the super input output controller, receives the user mode instruction.

5. A computer system having controllable processor and bus clock frequencies, the computer system comprising:
   a processor which operates at a selectable clock frequency
   a north bridle controller;
   a first bus connecting the north bridge controller to the processor, the first bus operating at a selectable clock frequency;
   a clock generator, the clock generator providing selectable clock frequencies to the processor and the first bus;
   a controller which instructs the clock generator as to clock frequency, whereby the controller receives commands from the computer system;
   a memory storage device comprising:
     a memory clock buffer which receives clock frequency signals from the clock generator;
     a RAM memory which receives clock frequency signals from the memory clock buffer; and
     a memory bus that interfaces to the processor; and
   a second bus connecting the memory storage device to the processor, wherein the clock frequency of the second bus is provided by the clock generator.

6. A computer system having controllable processor and bus clock frequencies, the computer system comprising:
   a processor which operates at a selectable clock frequency;

a north bridge controller;

a first bus connecting the north bridge controller to the processor, the first bus operating at a selectable clock frequency;

a clock generator, the clock generator providing selectable clock frequencies to the processor and the first bus;

a controller which instructs the clock generator as to clock frequency, whereby the controller receives commands from the computer system;

a power supply which provides selectable voltage to the processor, whereby the controller instructs the power supply as to voltage;

a memory storage device; and a second bus connecting the memory storage device to the processor, wherein the clock frequency of the second bus is provided by the clock generator.

7. The computer system of claim 6 further comprising:

a third bus;

a south bridge controller interfacing with the north bridge controller by the third bus; and a set of peripheral devices interfacing with the south bridge controller by the third bus.

8. The computer system of claim 7 further comprising:

a fourth bus; and a super input output controller interfacing with the south bridge controller by the third bus.

9. The computer system of claim 8 further comprising:

an user mode instruction which is received by the super input output controller, whereby system operating mode is changed when the super input output controller receives the user mode instruction.

10. A computer system having controllable processor and bus clock frequencies, the computer system comprising:

a processor which operates at a selectable clock frequency;

a north bridle controller:

a first bus connecting the north bridge controller to the processor, the first bus operating at a selectable clock frequency;

a clock generator, the clock generator providing selectable clock frequencies to the processor and the first bus, a controller which instructs the clock generator as to clock frequency, whereby the controller receives commands from the computer system;

a power supply which provides selectable voltage to the processor, whereby the controller instructs the power supply as to voltage;

a memory storage device a memory clock buffer which receives clock frequency signals from the clock generator;

a RAM memory which receives clock frequency signals from the memory clock buffer; and a memory bus that interfaces to the processor; and a second bus connecting the memory storage device to the processor, wherein the clock frequency of the second bus is provided by the clock generator.

* * * * *